Sept. 2, 1924.  L. LEWIS  1,507,074
DEMOUNTABLE RIM
Filed June 25, 1923
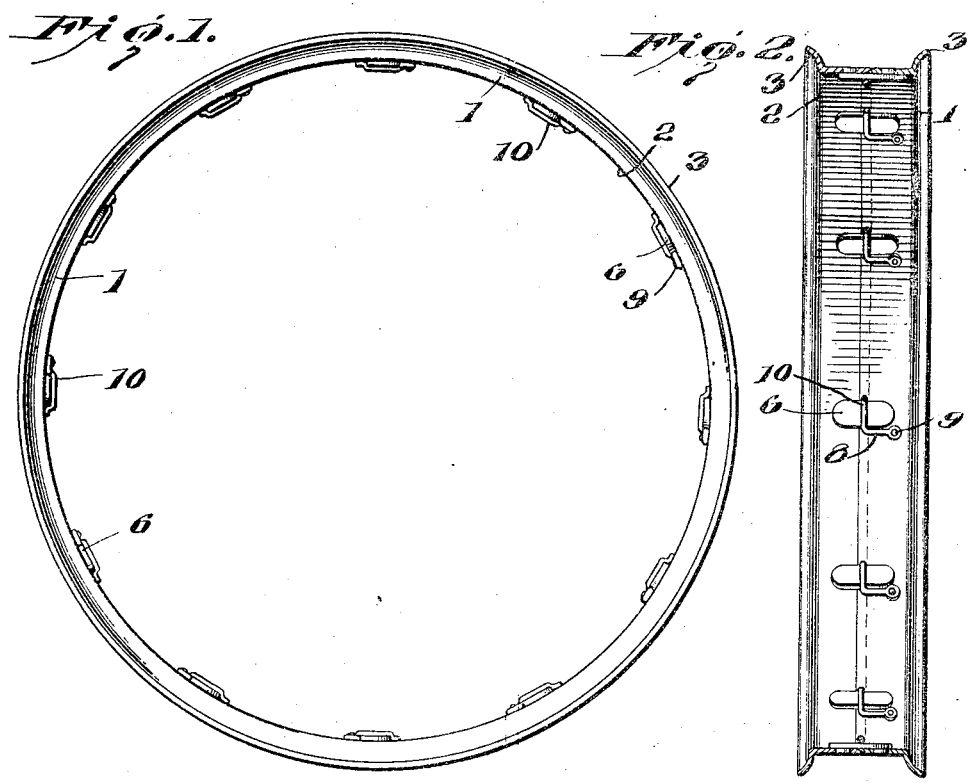
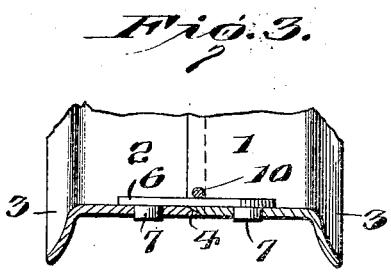
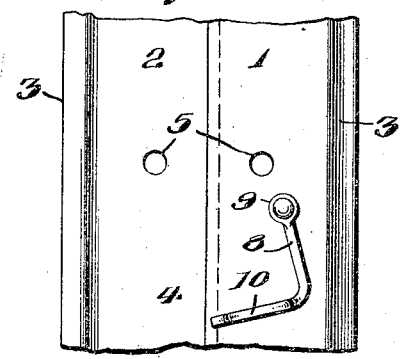
Inventor
Lloyd Lewis
By
Attorney Patented Sept. 2, 1924.

1,507,074

UNITED STATES PATENT OFFICE.

LLOYD LEWIS, OF MUSKEGON, MICHIGAN.

DEMOUNTABLE RIM.

Application filed June 25, 1923. Serial No. 647,540.

*To all whom it may concern:*

Be it known that I, LLOYD LEWIS, a citizen of the United States, residing at Muskegon, in the county of Muskegon and State of Michigan, have invented certain new and useful Improvements in Demountable Rims, of which the following is a specification.

This invention relates to improvements in demountable rims for automobiles and other vehicles equipped with pneumatic tires.

The prime object of this invention is to provide a demountable rim whereby a pneumatic tire can be easily and quickly placed on the rim without the use of special tools of any kind.

A further object of my invention is to provide a demountable rim comprising sections, each of which is provided with a flange for engagement with the beading of a pneumatic tire.

A still further object of my invention is to provide a demountable rim with a series of lugs for holding the sections together when placed on a wheel felly.

And a still further object of my invention is to provide a demountable rim comprising a pair of sections with a series of lugs for holding the sections together, a spring clamp adapted to engage and hold each of said lugs in locked engagement with the rim sections.

An additional object of my invention is to provide a demountable rim of the character indicated, which is simple in construction, durable, efficient for the purpose intended, and one that can be manufactured and placed on sale at a relatively low cost.

These and like objects of the invention will be better understood as the description follows and as is specifically pointed out in the appended claims.

Referring to the accompanying drawing which forms a part of this specification,

Figure 1 is a side elevation of a demountable rim constructed in accordance with my invention.

Figure 2 is a vertical section through same.

Figure 3 is an enlarged horizontal section through my improved demountable rim, showing the means employed for holding the rim sections together.

Figure 4 is a bottom plan view of a section of the rim, and

Figure 5 is a perspective view of one of the lugs employed for fastening the sections together.

Referring to the accompanying drawing in detail, like characters will be used to designate like parts in the different views.

The numerals 1 and 2 indicate a pair of sections which when secured together as will be hereinafter explained comprises my improved demountable rim. The sections are each provided with a flange 3 for engagement with the beading of a penumatic tire (not shown).

The inner edges of the sections 1 and 2 are held as at 4 to permit easy engagement with each other. Each of the sections are provided with a series of circular spaced openings 5 adjacent the inner edge and when the beveled edges of the sections are placed together the openings 5 in each section are directly opposite each other.

In order to hold the sections together and secure the pneumatic tire in position, a series of plates 6 having lugs 7 provided on one side are employed. The lugs 7 are formed on one side adjacent each end of the plate and are approximately of the same thickness as the sections 1 and 2. Each of the plates is positioned crosswise of the sections, the lugs engaging the openings 5.

The plates 6 are held in locked engagement with the sections by means of a spring clip 8 which is pivotally connected to the section 1 adjacent each of the openings 5 as at 9. The spring clips 8 are each bent at right angles and the extreme bent portion is provided with a recessed or raised portion as at 10, for engagement with the plates 6, so that after a tire has been placed on the sections 1 and 2, the plates are placed in position, and the spring clips 8 are moved on their pivots 9 until the raised or recessed portions 10 engage each of the plates, thereby firmly locking same in position and preventing their accidental dislodgment.

In case of tire trouble, it is a simple matter to remove the sections along with the pneumatic tire from the felly of a wheel, swing the spring clips out of engagement with the lugs, remove the lugs from the sections, and quickly separate the sections to remove the pneumatic tire for the purpose of repairing same.

In view of the foregoing description of my invention taken in connection with the accompanying drawing, it is thought that any further explanation as to the construction, operation, and objects of the invention is unnecessary.

While I have shown and described the preferred form of my invention, I realize that various minor changes may be resorted to, without departing from the spirit and scope of the invention as claimed, and therefore, I do not wish to limit myself to the exact details of construction shown, nor to the combination and arrangement of parts.

What I claim as new and desire to secure by Letters Patent is:

1. A demountable rim comprising a pair of sections each provided with a flange, cross plates adapted to engage each section for holding the same together, and a series of spring clips each adapted to engage a cross plate for holding the same in position.

2. A demountable rim comprising a pair of sections, a flange provided on each section, cross plates adapted to engage both sections for holding the same together, and a series of spring clips each having a recess formed therein for receiving a cross plate therein for holding said plates in locking engagement with said sections.

3. In a demounable rim, comprising a pair of sections each provided with a flange on one edge, each of said section being provided with a series of openings adapted to be positioned opposite each other when said sections are placed together, a series of plates each having a pair of spaced lugs adapted to fasten said sections together, and a series of spring clips pivotally connected to one of said sections and adapted to hold said plates into locking engagement with said sections.

In testimony whereof, I have affixed my signature in the presence of two witnesses.

LLOYD LEWIS.

Witnesses:
WILLIAM F. LEWIS,
OSCAR LEWIS.